UNITED STATES PATENT OFFICE.

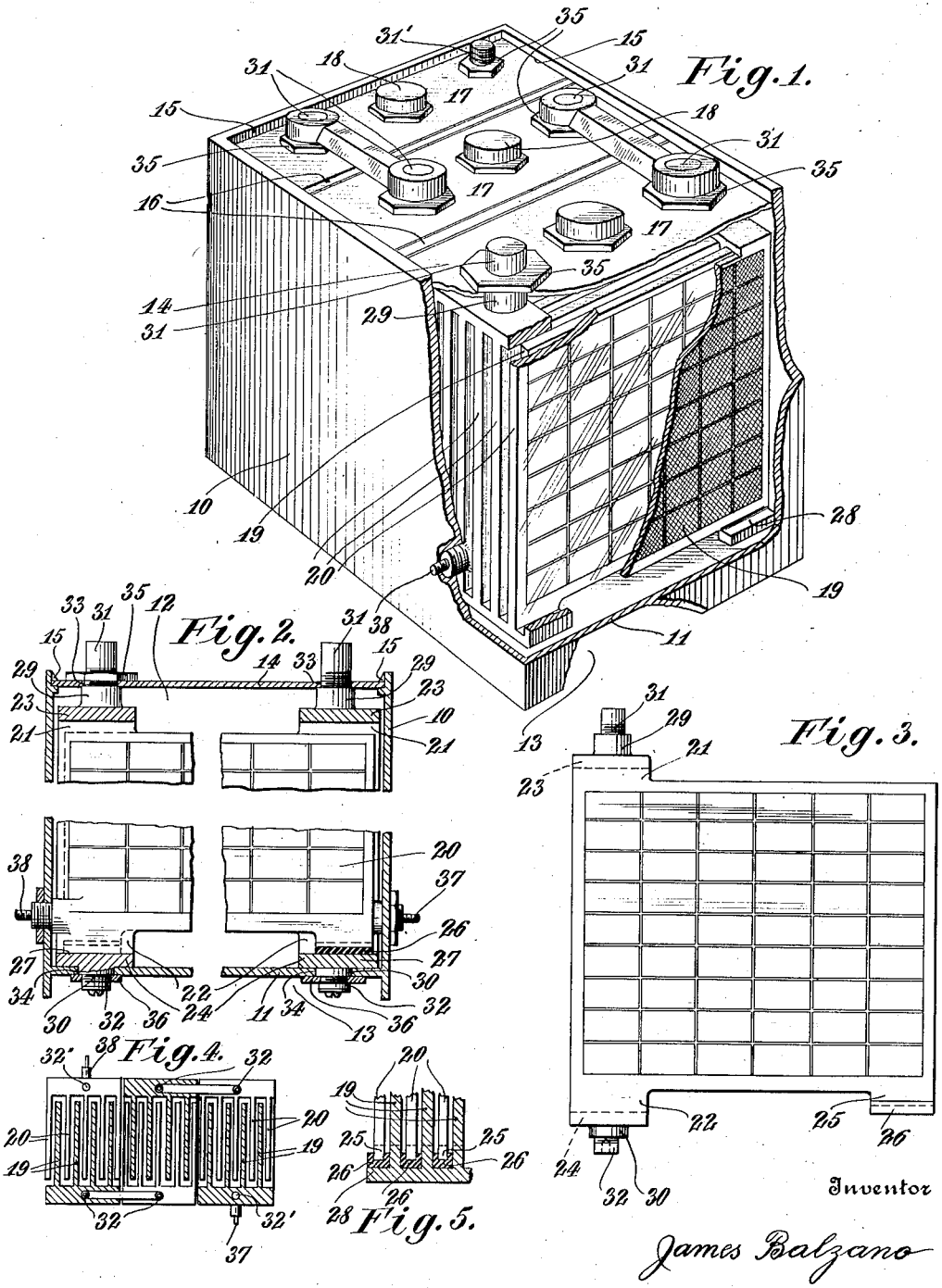

JAMES BALZANO, OF NEW YORK, N. Y.

STORAGE BATTERY.

1,362,554.  Specification of Letters Patent.  Patented Dec. 14, 1920.

Application filed November 20, 1919. Serial No. 339,387.

*To all whom it may concern:*

Be it known that I, JAMES BALZANO, citizen of the United States, and resident of New York city, in the county of New York and State of New York, have invented certain new and useful Improvements in Storage Batteries, of which the following is a specification.

This invention relates to storage or secondary batteries.

The primary object of my invention is to provide a durable battery which will permit its being simultaneously charged and discharged.

Another object of my invention is to provide a charge and discharge battery comprising a plurality of elements interconnected with each other not only at the top but also at the bottom for facilitating a proper charging and discharging of the battery and a uniform usage of the plates throughout while in operation.

Another object of my invention is to provide a battery the plates of which, when assembled, reciprocally support each other, while resting upon a common base.

A further object of my invention is to provide a charge and discharge battery comprising a plurality of elements, composed of plates which reciprocally support each other, said elements being interconnected with each other and fastened by way of their connections to the battery housing at its top and bottom, for preventing the plates from moving within the housing.

The foregoing and other objects will be more fully apparent from the following description and the accompanying drawings, forming part of this specification, in which:
Figure 1 is a perspective view of a three-element storage battery, partially in section.

Fig. 2 is a sectional view through such battery showing the arrangement of plates and their connections.

Fig. 3 is a side elevation of negative plates.

Fig. 4 is a diagrammatical view of a battery showing bottom connections between elements.

Fig. 5 is a detail view of the plates showing the manner of their reciprocal support.

Referring to the drawings, a casing or housing 10, illustrated, is preferably made of nonconductive material which will stand rough usage. The housing may be reinforced or otherwise strengthened. It possesses an elevated bottom 11 which divides the housing into one large chamber 12 for receiving the elements, and a small chamber 13 harboring the lower element connections. The top 14 of the housing is made waterproof all around the edges 15 and possesses water-tight partitions, indicated at 16, dividing the elements 17 from each other.

Above the center of each element a spill-proof air connection 18 is provided in the cover, which permits the gases generated within the elements to freely escape, and, when opened, to fill or refill the elements with an electrolytic liquid.

Each element consists of a series of positive plates 19 and negative plates 20 of any desired chemical or metallurgical composition. Both the positive and negative plates are made substantially alike in form and are designed for the purpose of interlocking and reciprocally supporting each other.

They are provided at one side with extensions 21 and 22, on top and bottom respectively, which extensions are connected with each other by bars or strips 23 and 24. The opposite side of the plates is free and is provided with lugs 25 having an insulating shoe 26 which, when two series of plates are set up, rests upon the upper face 27 of the lower connecting strips 24 between the plates of the opposite plate series.

Usually the number of positive plates in a battery is one less than the negative plates. Therefore the negative plates will inclose the positive plates at both sides of the element unit. A special support 28 on both ends of the positive plate series is provided for resting thereon the negative end plates.

The plates are spaced in such a way as to provide just enough room for the electrolytic liquid and the forming gas bubbles to freely pass by the plates.

At about the center of the upper and the lower connecting strips 23 and 24 are provided pole connections 29 and 30, respectively, forming an integral part of the strips. They possess an off-set partly threaded portion 31 and 32 which protrudes through openings 33 of the housing cover and openings 34 in the housing bottom. Convenient air-tight fastening means 35 and 36 secure these pole connections to the housing, preventing the plates from shifting or otherwise moving within their cells.

The upper pole connections 31 of the elements are interconnected in the usual manner. The positive and negative battery terminals 31' and 31" serve then as discharge connection.

The lower portions of the elements are similarly interconnected, as shown in Fig. 4, and possess charging terminals 32' and 32" placed at the bottom of the housing or other charging terminals 37 and 38 conveniently placed at the lower part and at the sides of the housing.

It will be found when using this battery, that a far greater efficiency may be obtained, and that the life of the battery will be doubled or trebled.

The foremost advantage of my battery is solidity in construction and the way the battery is adapted for use. When for instance charging a battery from the same cathode and anode from which the battery is to be discharged, the chemical reaction will be incomplete at the lower portion of the plates and in time it will be evident that it will take gradually a longer period to charge the battery, while the effective discharge period will be considerably shortened.

This will not be the case with my new battery which will not only outlast the present types, but make far longer and more effective discharge periods.

In addition my battery may be advantageously used as an intersecting or interconnecting element between an electric source and the place of electric consumption. My battery may serve then as balancing medium for taking up and storing a surplus of power or for giving up power when the electric source is over-taxed.

In whatever way and in whatever capacity my battery may be used the separate charge and discharge terminals will obviously improve its efficiency to a remarkable degree.

It is self evident that the construction shown in the drawings is not by any means to be construed as limiting my invention to the present design.

It is understood therefore that improvements and changes may be made without departing from the broad scope of my invention which I wish to cover by Letters Patent and for which I claim:

1. In a storage battery composed of at least one positive and one negative plate, connections at the lower end of the negative and positive plates adapted for charging the battery, connections at the upper ends of the respective plates adapted for discharging the battery, substantially as described.

2. In a storage battery composed of at least one set of positive and negative plates, positive and negative terminals provided at the bottom of the plates, and positive and negative terminals provided at the top of the plates, for the purpose set forth.

3. In a storage battery, the combination of two series of plates, one positive and the other negative, having positive and negative charging connections at their top and positive and negative discharging connections at their bottom.

4. In a storage battery, an element comprising one series of positive, another of negative plates, each series composed of two or more plates which are spaced and connected with each other at top and bottom at one end and free at the opposite end, insulated lugs fitting into the spaces between said plates, for supporting the free ends, connections for charging the battery provided at the bottom of the plates and separate connections at their top for discharging the battery.

5. In combination with a storage battery, a non-conductive housing, a series of elements comprising negative and positive plates, connections at the top of the elements interconnecting the same, a positive and a negative terminal provided on top of the housing for discharging the battery, connections at the bottom of the elements protruding through the bottom of said housing and interconnecting said elements, a negative and a positive terminal at the bottom of the housing for charging the battery.

6. In combination with a storage battery, a nonconductive housing having an elevated bottom, positive and negative plates forming a series of elements in said housing the positive and the negative plates of each element being spaced and connected with each other at their upper and lower parts at one side and free at their other side, the free ends of the positive plates resting in the spaces provided between the negative plates, the free ends of the negative plates resting in the spaces provided between the positive plates, the free ends, having insulated supporting lugs fitting into and bearing against the bottom parts of the plate connections, conductors provided at the top of the housing between said elements, similar conductors provided at the elevated bottom of the housing, terminals at the lower part of the housing for charging the battery, and other terminals at the top of the housing for discharging the battery.

7. In combination with a chargeable and dischargeable battery, a series of elements comprising one row of negative and another row of positive plates, the plates of each row being spaced and connected at one end at top and bottom and being free at the other end, the free ends of one row resting upon insulated logs between the opposite disposed connected ends of the other row, a housing having an elevated bottom, interconnection between the elements on top and bottom, charging terminals at the bottom and discharging terminals at the top of the housing for simultaneously charging and discharging the battery while in use.

Signed at New York city, in the county of New York and State of New York, this 31st day of October, A. D. 1919.

JAMES BALZANO.